United States Patent Office 3,463,895
Patented Aug. 26, 1969

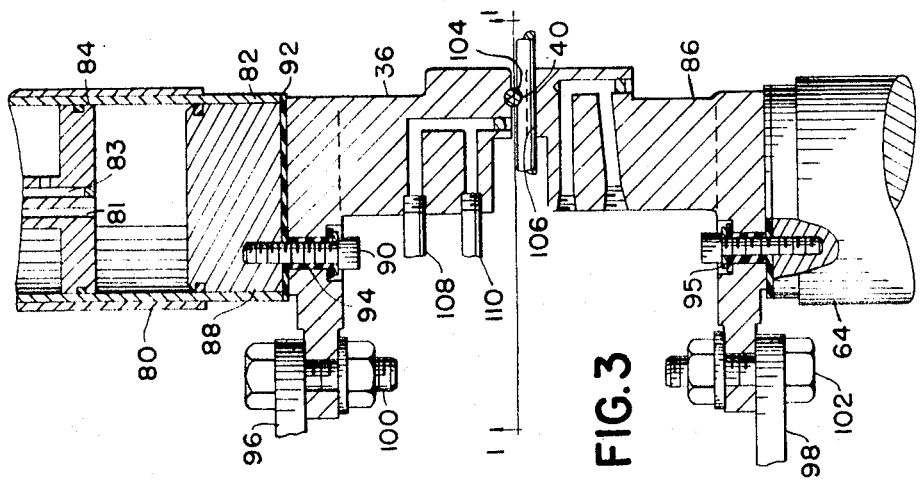
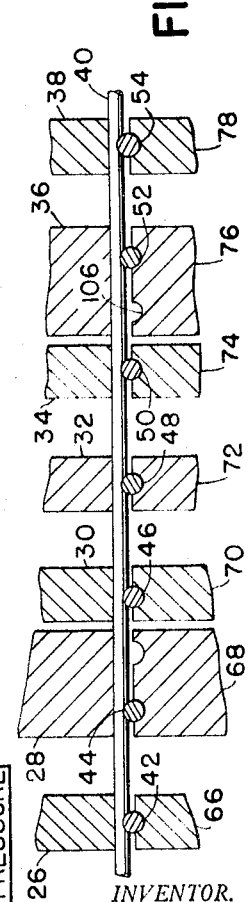
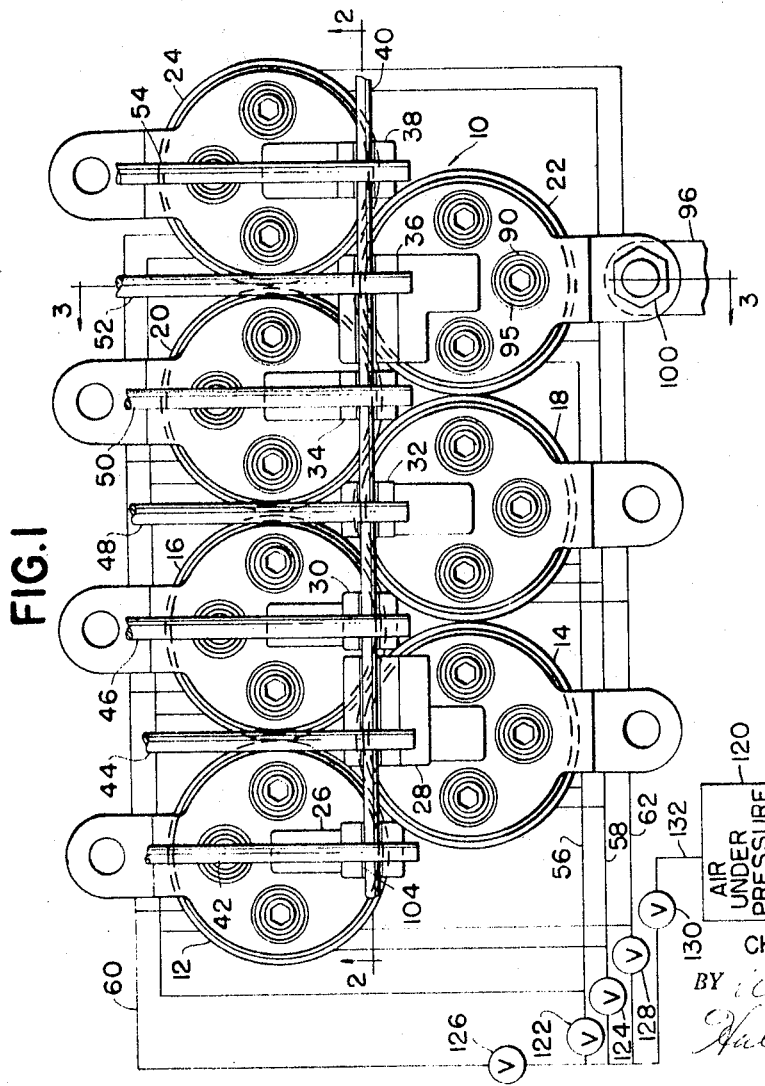

3,463,895
MESH WELDER
Charles Senn, 12633 Wilfred Ave.,
Detroit, Mich. 48205
Filed Dec. 6, 1965, Ser. No. 511,942
Int. Cl. B23k 11/10
U.S. Cl. 219—56    7 Claims

ABSTRACT OF THE DISCLOSURE

Apparatus for welding longitudinally extending linear members at selected spacing to a transversely extending linear member to provide mesh for reinforcing concrete or the like is provided. The apparatus includes a plurality of welding guns having electrodes secured thereto which electrodes are eccentric to the guns and are positioned at selected spacing along the transversely extending linear member. The electrodes are engageable with the linear members at different selected spacing on actuation of different welding guns. A plurality of separate manifolds are connected to the welding guns for actuating separate groups of the welding guns to bring selected electrodes into engagement with the linear members at the selected spacing along the transversely extending linear member.

---

The invention relates to welding and refers more specifically to structure for and a method of providing welds at selected spaced apart linear intervals for use in producing concrete reinforcing mesh or the like wherein a plurality of transversely extending parallel spaced apart linear members are welded to longitudinally extending parallel linear members which are at a predetermined transverse spacing with respect to each other.

In the past structure for producing longitudinally spaced apart welds on linear members, such as wire for producing wire mesh to be used in reinforced concrete or the like have been particularly complicated. With prior structures changing the spacing of the welds to produce mesh of different size has required down time of the welding structure of as much as twenty hours or more for each dimension change in the size of the mesh. Thus, change of size of mesh has been expensive in the past so that short runs of mesh of a particular size have not been accomplished economically.

It is therefore an object of the present invention to provide improved structure for welding linear members to members extending perpendicularly thereto at selected spacing therealong.

Another object is to provide an improved method for welding linear members to members extending perpendicularly thereto at selected spacing therealong.

Another object is to provide means for welding wire mesh or the like including a plurality of welding guns having offset electrodes thereon positioned in a straight line for welding a linear transverse member to a plurality of longitudinal members at selected spacing longitudinally of the transverse member and separate means for actuating groups of said welding guns in accordance with the selected spacing between the welds.

Another object is to provide structure as set forth above wherein the means for actuating groups of welding guns includes separate manifolds for each selected weld spacing.

Another object is to provide structure as set forth above wherein the welding guns are air operated cylindrical guns positioned in two adjacent rows on opposite sides of a linear member to be welded with the guns in one row positioned between and in contact with the guns in the other row.

Another object is to provide structure as set forth above wherein the welding guns are provided in the same configuration in opposed relation over the top and under the bottom of the members to be welded.

Another object is to provide a method of welding a transversely extending linear member to longitudinally extending linear members extending perpendicularly thereto at selected spacing therealong, comprising providing a plurality of cylindrical welding guns staggered on both sides of the transversely extending linear member in contact with each other having offset electrodes secured thereto and positioned over the top and under the bottom of the transversely extending linear member in opposed pairs and actuating selected pairs of said welding guns to cause the electrodes secured to the selected guns to contact the linear members at the selected spacing.

Another object is to provide structure for and a method of welding metal wire mesh or the like which is simple, economical and efficient.

Other objects and features of the invention will become apparent as the description proceeds, especially when taken in conjunction with the accompanying drawing, illustrating a preferred embodiment of the invention, wherein:

FIGURE 1 is a view of a bank of welding guns constructed and arranged in accordance with the invention to weld wire mesh having selected mesh dimensions taken substantially on line 1—1 in FIGURE 3.

FIGURE 2 is a partial section view of welding gun banks constructed and arranged in accordance with the invention taken substantially on the line 2—2 in FIGURE 1.

FIGURE 3 is a section view of a portion of welding gun banks constructed and arranged in accordance with the invention taken substantially on the line 3—3 in FIGURE 1.

With particular reference to the figures of the drawing, one embodiment of the present invention will now be disclosed in detail.

The welding gun bank 10 illustrated in FIGURE 1 includes seven separate air operated welding guns 12, 14, 16, 18, 20, 22 and 24 having offset electrodes 26, 28, 30, 32, 34, 36 and 38, respectively, secured thereto. The electrodes 26, 28, 30, 32, 34, 36 and 38 are spaced along the linear transversely extending metal wire 40 which it is desired to weld to the longitudinally extending metal wires 42, 44, 46, 48, 50, 52 and 54. Separate manifold means 56, 58, 60 and 62 are provided for actuating selected ones of the guns 12, 14, 16, 18, 20, 22 and 24 to weld the transverse wire to longitudinal wires at selected spacing along the transverse wire 40 to provide wire mesh of a selected size. An exactly similar bank of welding guns, only one of which 64 is illustrated, is positioned in opposed relation to the welding gun bank 10 and includes opposed offset electrodes 66, 68, 70, 72, 74, 76 and 78, as shown in FIGURE 2.

More specifically the welding guns may be as disclosed in United States Patent No. 3,008,033. As illustrated in FIGURE 3, each welding gun includes an outer cylinder 80 which may be secured in a fixed position, an inner cylinder 82 reciprocally mounted within the outer cylinder 80 and a guide piston 84 for guiding the reciprocal movement of the cylinder 82 within the cylinder 80, and passages 81 and 83 for entrance and exit of actuating air into the inner cylinder on both sides of the piston 84. The actuating air is supplied from the manifolds 56, 58, 60 and 62 in accordance with the size mesh it is desired to weld.

The upper electrodes 26, 28, 30, 32, 34, 36 and 38 and the opposed lower electrodes 66, 68, 70, 72, 74, 76 and 78 are each secured to the end plate 88 of an inner cylinder 82 by convenient means, such as bolts 90 connected to the cylinder end plate 88 and insulated therefrom by the insulating pad 92, bushing 94 and washer 95. The electrodes are connected to a source of electrical energy (not shown) through convenient means, such as connectors 96 and 98 connected to the electrodes 36 and 76, as shown in FIGURE 3, by the bolts 100 and 102, respectively.

The upper electrodes 26, 28, 30, 32, 34, 36 and 38 are provided with a positioning groove 104 in the end thereof in which the transversely extending wire 40 is positioned during welding. The lower electrodes 86 are provided with the grooves 106 therein in which the longitudinally extending members 42, 44, 46, 48, 50, 52 and 54 are positioned during welding.

As illustrated best in FIGURE 2, the electrodes 68 and 76 have two grooves 106 therein spaced longitudinally of the transversely extending member 40 by one inch. As shown best in FIGURE 3, a cooling fluid inlet 108 and outlet 110 is provided in each of the electrodes.

The separate manifolds 56, 58, 60 and 62 are connected to a supply of air under pressure 120 through separate valves 122, 124, 126 and 128 in series with the actuating valve 130 in the air supply conduit 132 from the supply of air under pressure 120.

In overall operation, one of the valves 122, 124, 126 and 128, which may be hand operated valves, will be open while the other valves will be closed. Thus on actuation, for each set of welds at the spacing determined by the open valve, the valve 130 is opened to provide air under pressure in the manifold 56, 58, 60 or 62 with which the open valve is associated.

The manifolds 56, 58, 60 and 62 are connected to the welding gun bank 10 and to the similar opposed welding gun bank represented by the single welding gun 64, as shown in FIGURE 1 to supply air simultaneously to actuate both the upper and lower welding guns to which the manifolds illustrated are connected. Each separate manifold is connected to the proper welding guns to provide welds at different selected spacing along the transversely extending member 40 in conjunction with longitudinally extending members in grooves 106 at the selected spacing in the electrodes 66, 68, 70, 72, 74, 76 and 78.

Thus, when the air under pressure from the air supply 120 is fed into the manifold 56 through open valve 122, on actuation of the valve 130, all of the welding guns 12, 14, 16, 18, 20, 22 and 24 and the corresponding welding guns in the lower, opposed bank of welding guns will be actuated to provide two inch spacing of welds along the transversely extending member 40 in conjunction with the longitudinally extending members 42, 44, 46, 48, 50, 52 and 54 positioned in the grooves 106, as shown in FIGURE 2.

With the valves 122, 126 and 128 closed and valve 124 open, air will enter the manifold 58 through valve 130 from air supply 120 on actuation of valve 130 to actuate the welding guns 12, 14, 18, 22 and 24. Thus, three inch spacing of the welds along the transverse wire 40 will be provided with longitudinal wires in the grooves 106 of the electrodes associated with the welding guns 12, 18 and 24 and with longitudinal wires in the right hand groove in electrode 28 and in the left hand groove in electrode 36, as shown in FIGURE 1.

Likewise a four inch weld spacing may be produced by opening valve 126, closing valves 122, 124 and 128 with the longitudinally extending wires 42, 46, 50 and 54 positioned in the grooves 106 as shown. Six inch spacing is provided with only the valve 128 open each time the valve 130 is actuated since the manifold 118 is connected to actuate the welding guns 12, 18 and 24 with longitudinally extending wires in the grooves 106 associated with these welding guns.

It will be noted that with the dimensions illustrated the welding guns may be four inches in diameter to provide a compact welding gun bank capable of readily producing welds for securing longitudinal and transverse wires of mesh or the like together with selected spacings of two, three, four and six inches. The construction of the welding guns wherein the electrodes are connected to inner cylinders which reciprocate within outer cylinders and are guided by an inner stationary piston to permit eccentric positioning of the electrodes so that they may extend over the linear member 40, as illustrated in FIGURE 1, in a particularly compact welding gun bank is also worthy of note.

As indicated above the welding gun bank 10 is mirrored below the transversely extending wire 40 by a similar welding gun bank which is actuated from the same manifolds through the same valves as the welding gun bank 10. Thus the lower bank of welding guns is actuated simultaneously although normally with a considerably smaller travel than the welding guns in the welding gun bank 10 which are positioned over the transversely extending member 40.

Thus, it will be seen that in accordance with the invention there has been provided structure for and a method of welding mesh for use in reinforced concrete or the like in which the mesh size may be selected. Further it will be seen that the different size mesh may be selected by merely closing one of the valves 122, 124, 126 and 128 and opening another valve to provide a different weld spacing. Changeover from one spacing to another is thus rapid and efficient in contrast to present mechanical spring biased structures.

In addition it will of course be understood that while a one foot long welding gun bank 10 has been described in detail for illustrative purposes, a plurality of banks may be provided for welding mesh, for example six, eight or more feet wide, using the same principles. Other separate manifolds could also be provided for separate spacing as desired.

While one embodiment of the invention has been disclosed in detail, it will be understood that other embodiments and modifications are contemplated. Thus it will be understood for example that although it is not as efficient, either the upper or lower bank of welding guns may be stationary or a stationary group of electrodes may be provided in conjunction with a single movable bank of welding guns. It is intended to include all embodiments and modifications as are defined by the appended claims within the scope of the invention.

What I claim as my invention is:

1. Apparatus for welding longitudinally extending linear members at selected spacing to a transversely extending linear member, such as in mesh for reinforcing concrete or the like, comprising seven cylindrical welding guns positioned along a foot of the transversely extending linear member staggered on each side of the linear member wherein each of said guns is positioned in contact with the immediately adjacent guns, electrodes secured to the welding guns positioned off center of the welding guns over the transversely extending linear member, the first welding gun having a first electrode engageable with the transversely extending linear member at the start of the foot of the transversely extending linear member, the second welding gun having an electrode engageable with the transversely extending linear member at two and three inches from the first electrode, the third welding gun having an electrode engageable with the transversely extending linear member at four inches from the first electrode, the fourth welding gun having an electrode engageable with the transversely extending linear member at six inches from the first electrode, the fifth welding gun having an electrode engageable with the transversely extending linear member at eight inches from the first electrode, the sixth welding gun having an electrode engageable with the transversely extending linear member at nine and ten inches from the first electrode and the seventh welding gun having an electrode engageable with the transversely extending linear member one foot from the first electrode, and a plurality of separate means connected to said welding guns for actuating separate groups of the welding guns to bring selected electrodes into engagement with the linear members at the selected spacing along the transversely extending linear member.

2. Structure as set forth in claim 1 and further including an equal number of welding guns having electrodes secured thereto disposed opposite said seven welding guns to provide seven opposing pairs of welding guns operable on actuation to clamp the linear members between opposed electrodes secured thereto at the selected spacing.

3. Structure as set forth in claim 2 wherein the means for engaging selected ones of said electrodes with the linear members includes a separate manifold for actuating all seven of said opposed pairs of welding guns to provide welds on said transversely extending linear members at two inch spacing in conjunction with longitudinally extending members at two inch spacing along the transversely extending linear member.

4. Structure as set forth in claim 2 wherein the means for engaging selected ones of said electrodes with the linear members includes a separate manifold for actuating the first, second, fourth, sixth and seventh opposed pairs of welding guns to provide welds on said transversely extending linear member at three inch spacing in conjunction with longitudinally extending members at three inch spacing along the transversely extending linear member.

5. Structure as set forth in claim 2 wherein the means for engaging selected ones of said electrodes with the linear members includes a separate manifold for actuating the first, third, fifth and seventh welding guns to provide welds on said transversely extending linear member at four inch spacing in conjunction with longitudinally extending members at four inch spacing along the transversely extending linear member.

6. Structure as set forth in claim 2 wherein the means for engaging selected ones of said electrodes with the linear members includes a separate manifold for actuating the first, fourth and seventh welding guns to provide welds on said transversely extending linear member at six inch spacing in conjunction with longitudinally extending members at six inch spacing along the transversely extending linear member.

7. Structure as set forth in claim 1 wherein the individual welding guns include an outer cylinder, an inner cylinder reciprocal within the outer cylinder, a guiding piston carried by the outer cylinder and positioned within the inner cylinder, means for alternatively supplying and exhausting air from opposite ends of the inner cylinder and means for securing an electrode to one end of the inner cylinder for movement therewith.

References Cited

UNITED STATES PATENTS

| | | | |
|---|---|---|---|
| 2,042,322 | 5/1936 | Martin | 219—86 |
| 3,008,033 | 11/1961 | Senn | 219—87 X |
| 1,123,558 | 1/1915 | Lachman | 219—87 |
| 1,143,220 | 6/1915 | Mack | 219—87 |
| 2,312,938 | 3/1943 | Stieglitz | 219—89 |
| 2,358,826 | 9/1944 | Purat | 219—89 |
| 2,588,062 | 3/1952 | Vorderstrasse | 219—56 |

JOSEPH V. TRUHE, Primary Examiner

B. A. STEIN, Assistant Examiner

U.S. Cl. X.R.

219—89